United States Patent [19]

Kobayashi et al.

[11] Patent Number: 4,651,848
[45] Date of Patent: Mar. 24, 1987

[54] APPARATUS FOR SELECTING A POWER TRANSMISSION SYSTEM OF A FOUR-WHEEL DRIVE MOTOR VEHICLE

[75] Inventors: Toshio Kobayashi; Shinichirou Mura, both of Tokyo, Japan

[73] Assignee: Fuji Jukogyo Kabushiki Kaisha, Tokyo, Japan

[21] Appl. No.: 743,240

[22] Filed: Jun. 11, 1985

[30] Foreign Application Priority Data

Jul. 9, 1984 [JP] Japan ................... 59-141754

[51] Int. Cl.$^4$ ............ B60K 17/344; B60K 23/08; G05G 5/10
[52] U.S. Cl. ...................... 180/247; 74/475; 74/477; 74/745
[58] Field of Search ............ 180/247; 74/475, 477, 74/745

[56] References Cited

U.S. PATENT DOCUMENTS

| | | | |
|---|---|---|---|
| 4,241,621 | 12/1980 | Kodama | 180/247 X |
| 4,277,983 | 7/1981 | Izumi et al. | 74/477 |
| 4,305,309 | 12/1981 | Ookubo et al. | 180/247 X |
| 4,356,879 | 11/1982 | Uchiyama | 180/247 |
| 4,508,190 | 4/1985 | Uchiyama | 180/247 |

Primary Examiner—Allan D. Herrmann
Attorney, Agent, or Firm—Martin A. Farber

[57] ABSTRACT

A selecting device for four-wheel transmission for four-wheel drive motor vehicle comprising a sub-transmission to transmit the power of the engine to a main transmission, a transfer clutch device for transmitting the power to auxiliary drive wheels, a cylindrical shaft for shifting a clutch in the sub-transmission, an actuating rail, a fixed rail, a shift fork slidably mounted on the actuating rail and on the fixed rail and engaged with the transfer clutch device, and an arm slidably mounted on the actuating rail and integral with the cylindrical shaft. The actuating rail is slidably engaged with the cylindrical shaft. A select lever is operatively connected to the actuating rail and disposed in alignment with the actuating rail.

6 Claims, 11 Drawing Figures

APPARATUS FOR SELECTING A POWER TRANSMISSION SYSTEM OF A FOUR-WHEEL DRIVE MOTOR VEHICLE

BACKGROUND OF THE INVENTION

The present invention relates to an apparatus for selecting a power transmission system of a four-wheel drive motor vehicle having a sub-transmission for providing a high speed range four-wheel drive, and a low speed range four-wheel drive, and more particularly to an apparatus for manually changing a two-wheel drive power transmission to a high speed range four-wheel drive or a low speed range four-wheel drive.

U.S. Pat. No. 4,356,879 discloses a transmission provided with a transfer clutch for changing the two-wheel drive power transmission to the four-wheel drive power transmission, with a clutch for the sub-transmission, and with a selecting device for operating both clutches for selecting the two-wheel drive, high speed range four-wheel drive, or low speed range four-wheel drive. The selecting device comprises an actuating rail operated by a select lever, a fixed rail, and a shift rail for operating the clutch for the sub-transmission. Such a construction comprising three rails renders the device complicated and large in size. Farther, the actuating rail, the shift rail and a select lever for operating the actuating rail are at offset or staggered positions. Accordingly, the movement of the actuating rail causes moments in elements of the device to which produce frictional resistances and torsions, which detract from the operability of the device.

SUMMARY OF THE INVENTION

An object of the present invention is to provide a select device which is simple in construction and small in size.

Another object of the present invention is to provide a select device which may be easily and smoothly operated.

According to the present invention, there is provided an apparatus for selecting a power transmission system of a four-wheel drive motor vehicle having a main transmission and a sub-transmission operatively connected to an input shaft of the main transmission, the sub-transmission including reduction gear trains and a manual clutch means manually operable to select the transmitting speed for transmitting the output of an engine to the input shaft, a transfer device for transmitting the output of the transmission to auxiliary drive wheels of the vehicle, the transfer device comprising a manual transfer clutch. The apparatus comprises a cylindrical shaft for shifting the clutch means in the sub-transmission, an actuating rail slidably supported in the case, a fixed rail disposed in parallel with the actuating rail, a select lever connected to the actuating rail, a shift fork slidably mounted on the actuating rail and the fixed rail, the shift fork being connected to the transfer clutch, an arm slidably engaged with the actuating rail and the fixed rail and secured to the cylindrical shaft, a select lever operatively connected to the actuating rail, the connecting portion of the select lever being substantially in alignment with the actuating rail. The apparatus further comprises first interlock means provided between the actuating rail and the shift fork and the fixed rail for causing the actuating rail and the shift fork to come into fixed engagement relation to each other within a first moving range of the actuating rail, thereby to shift the shift fork by manipulating the select lever, and for causing the shift fork and the fixed rail to engage with each other within a second moving range of the actuating rail, second interlock means provided between the actuating rail and the arm and the fixed rail for causing the actuating rail and the arm to come into fixed engagement relation to each other within the second moving range of the actuating rail, thereby to shift rail, and for causing the arm and the fixed rail to engage with each other within the first moving range of the actuating rail, and means disposed on the actuating rail for moving the shift fork and the arm.

The other objects and features of this invention will become understood from the following description with reference to the accompanying drawings.

BRIEF DESCRIPTION OF THE DRAWINGS

FIG. 2 is a horizontal sectional view of a part of the transmission of FIG. 1a;

FIG. 5 is a sectional view taken along the line V—V of FIG. 4a; and

DETAILED DESCRIPTION OF THE PREFERRED EMBODIMENT

Referring now to the drawings, and more particularly to FIGS. 1a, 1b and 2a, 2b, there is illustrated a longitudinally disposed trans-axle type transmission for a four-wheel drive motor. The transmission comprises a transmission case 1, a transfer case 2 secured to the case 1 at the rear end thereof, and an extension case 3 secured to the case 2. The transmission case 1 comprises a pair of longitudinally divided shells and the inside thereof is divided into three compartments 4 to 6. A clutch 7 is provided in the forward compartment 4, and a sub-transmission 20 and a front differential 30 are arranged in the middle compartment 5. A main transmission 40 is provided in the compartment 6 and case 2, and a transfer device 60 is disposed in the case 2. In the driving system, a crank shaft 8 of an engine (not shown) is operatively connected to an end of an input shaft 9 through the clutch 7 and the sub-transmission 20 is disposed between the input shaft 9 and a main drive shaft 10 of the main transmission 40.

Figure 1A:
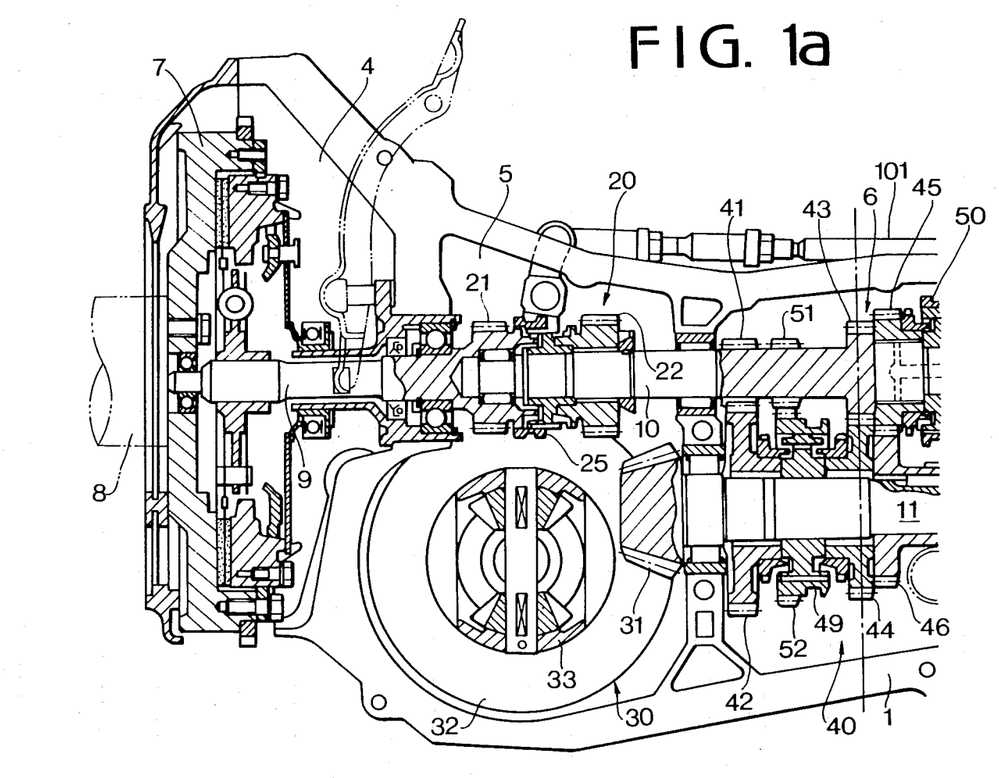
FIG. 1a and 1b are portions a longitudinal sectional view showing a transmission for a four-wheel drive motor vehicle to which the present invention is applied.
Figure 1B:
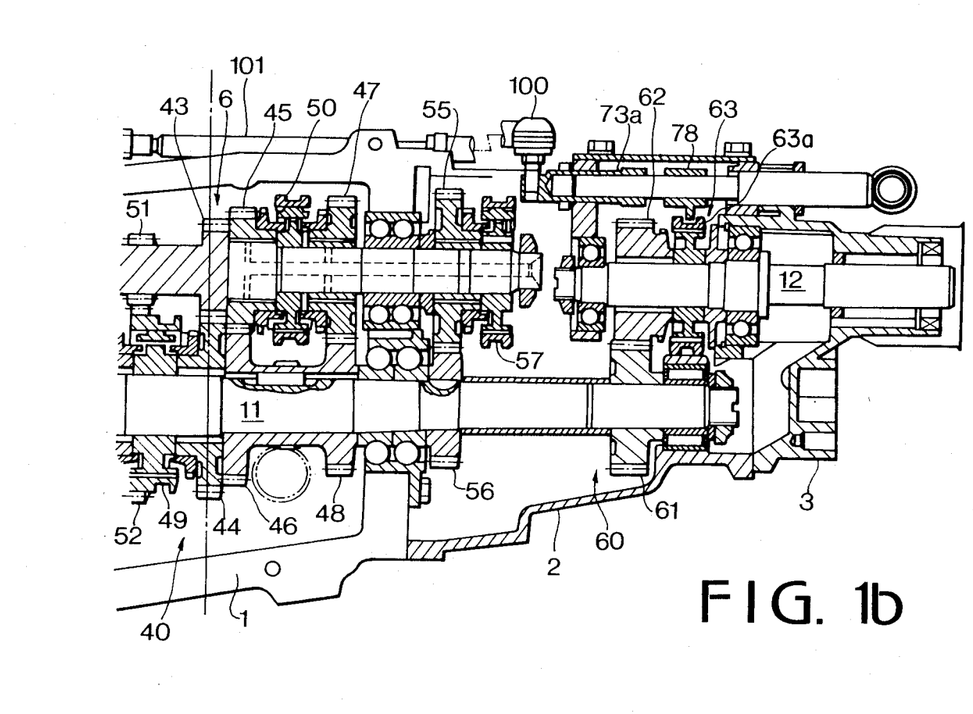
Figure 2:
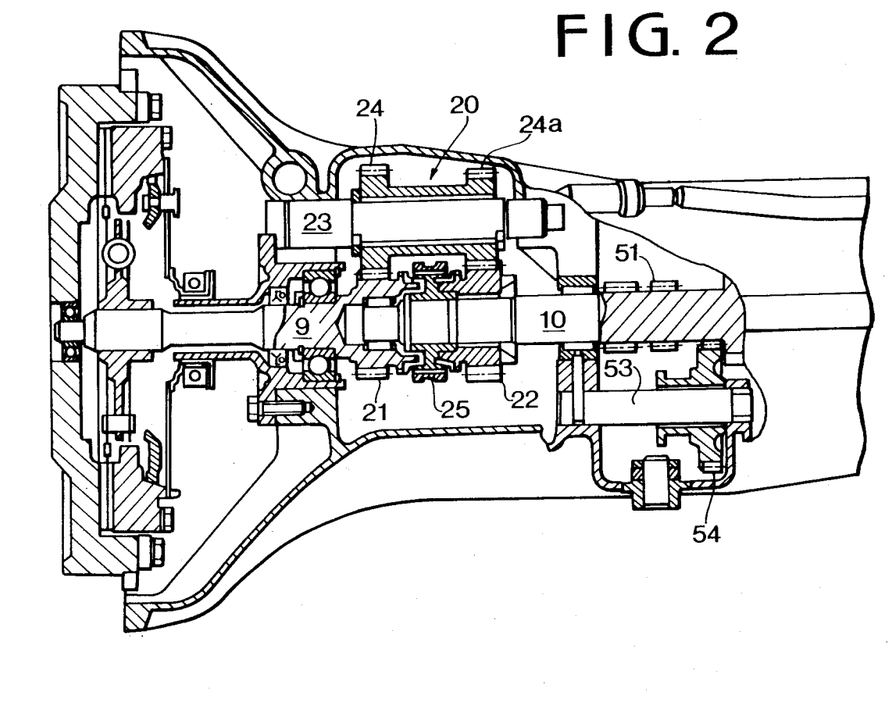
Figure 3A:
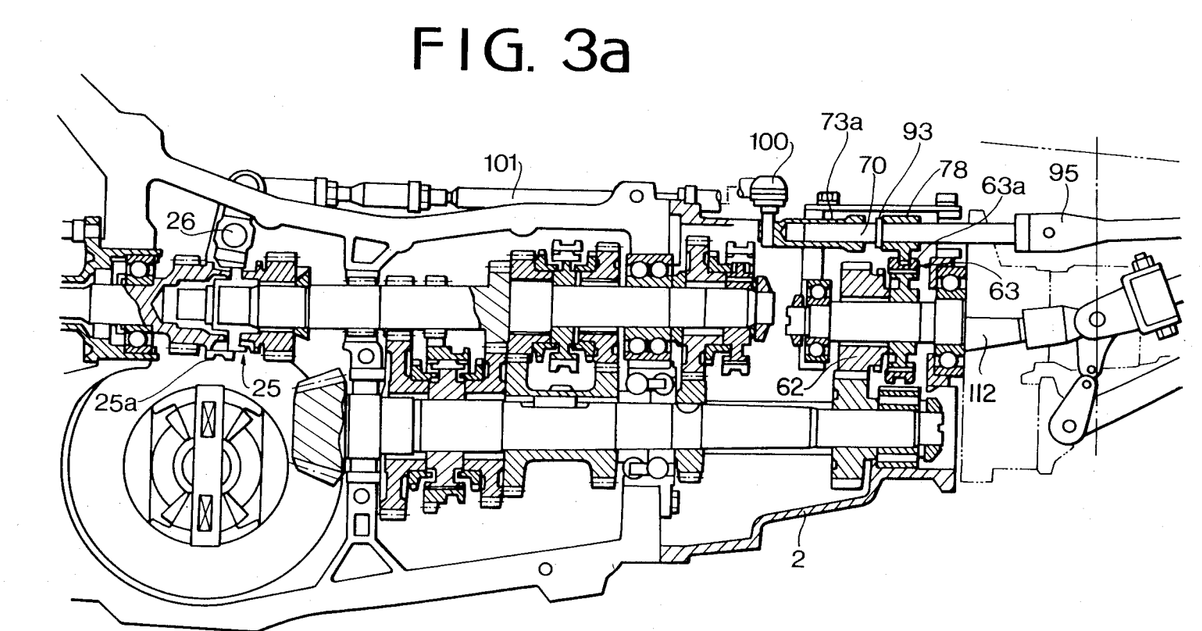
FIGS. 3a and 3b are portions of a sectional view of an embodiment of the present invention.
Figure 3B:
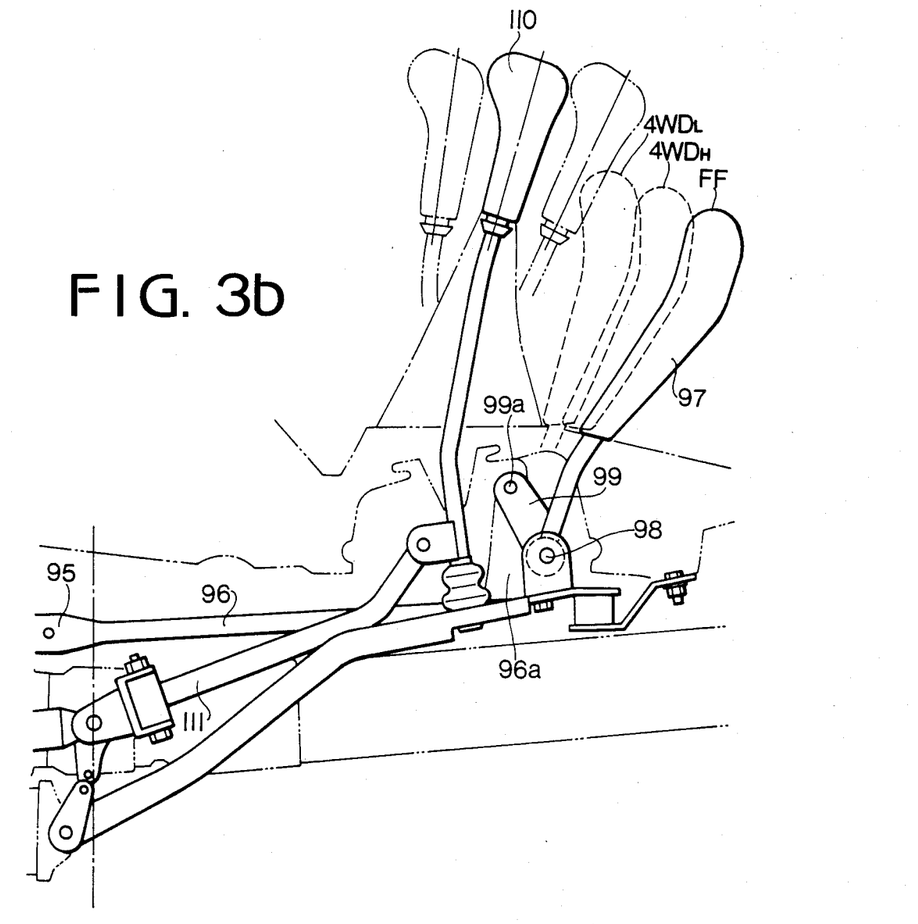

The sub-transmission 20 comprises a high speed gear 21 formed on the input shaft 9, a low speed gear 22 rotatably mounted on the main drive shaft 10 which is in alignment with the shaft 9, counter gears 24 and 24a (FIG. 2) rotatably mounted on a counter shaft 23, and engaged with both gears 21 and 22, respectively, and a synchronizer 25 as a clutch disposed between the high speed gear 21 and the low speed gear 22 connected with the main drive shaft 10. As shown in FIG. 1a, when the synchronizer 25 is engaged with the high speed gear 21, the shaft 9 is directly coupled to the shaft 10 to provide a higher speed drive range, and, on the contrary, when the synchronizer 25 is engaged with the low speed gear 22, the gear 21 is connected to the shaft 10 through gears 24, 24a and 22 to provide a lower speed drive range. The main transmission 40 is a five-speed transmission with overdrive, in which an output shaft 11 is arranged below the drive shaft 10 in parallel with it. First gears 41 and 42, second gears 43 and 44, third gears 45 and 46, and fourth gears 47 and 48 are provided on both shafts 10 and 11. The first and second driven gears 42 and 44 are rotatably mounted on the output shaft 11 and a synchronizer 49 connected with the output shaft 11 is disposed between the driven gears. The third and fourth drive gears 45 and 47 are rotatably mounted on the main drive shaft 10 and a synchronizer 50 connected with the main drive shaft 10 is disposed between the drive gears. For reverse driving, an idler gear 54 is slidably mounted on a shaft 53 as shown in FIG. 2, and adapted to be engaged with a drive gear 51 on the drive shaft 10 and with a driven gear 52 on the sleeve of the synchronizer 49. In addition, the main transmission has fifth speed gears 55 and 56 between the main drive shaft 10 and the output shaft 11, and a synchronizer 57 arranged between the rotatable drive gear 55 and the shaft 10. A drive pinion 31 is formed at the front end of the shaft 11 and engaged with a crown gear 32 of the front differential 30, and a differential gear device 33 of the front differential 30 is coupled to front wheels of the vehicle. The synchronizers 49, 50 and 57 are operated through rods 111 and 112 by a gear shift level 110.

In the transfer device 60, a transfer drive gear 61 securely mounted on the output shaft 11 is engaged with a driven gear 62 rotatably mounted on a rear drive shaft 12 and a transfer clutch 63 in the form of a synchronizer is disposed between the gear 62 and the shaft 12.

Explaining a selecting device for operating the synchronizer 25 of the sub-transmission 20 and the clutch 63 of the transfer device 60 with reference to FIGS. 3a to 5, an actuating rail 70 is provided in parallel with a fixed rail 71 at a position above the transfer clutch 63 within the transfer case 2 and a rear portion of the rail 70 is slidably supported by a supporting portion 2a formed in the transfer case. The actuating rail 70 extends rearwardly from the case 2, and the fixed rail 71 is secured to the case 2 by a pin 72. A connecting arm 73 is slidably engaged with the rails 70 and 71. The connecting arm 73 has a cylindrical shaft 73a which is slidably mounted on the actuating rail 70 and slidably supported by a supporting portion 2b of the case 2. A spring-loaded lock ball 74 is provided in the supporting portion 2a so as to engage with a respective notch 75 to 77 formed on the actuating rail 70, corresponding to three shift positions. A shift fork 78 engaged with a sleeve 63a of the transfer clutch 63 is slidably mounted on both the rails 70 and 71. In the fork 78, a spring-loaded lock ball 79 is provided so as to engage with one of two notches 80 and 81 formed in the rail 71 corresponding to the positions FF (front wheel drive) and 4WD (four-wheel drive). An interlock pin 82 is slidably provided in the shift fork 78 so as to be engaged with one of notches 83 and 84 formed in the rails 70 and 71 at the positions FF and 4WD, respectively. A spring-loaded lock ball 85 is provided in the arm 73 so as to engage with one of notches 86 and 87 formed in the rail 71, corresponding to positions for the higher and lower speed ranges of the sub-transmission 20. An interlock pin 90 is slidably provided in the arm 73 so as to be engaged with one of notches 91 and 92 formed in the rails 71 and 70, respectively. Snap rings 88, 89 acting as stoppers are fitted on the rail 71 and a snap ring 93 is secured to the rail 70 between the shift fork 78 and the arm 73. A switch 94 (FIG. 4b) is provided to be operated by a rod 78a of the fork 78 thereby to detect the selection of the high speed range four-wheel drive (4WD).

Figure 4A:
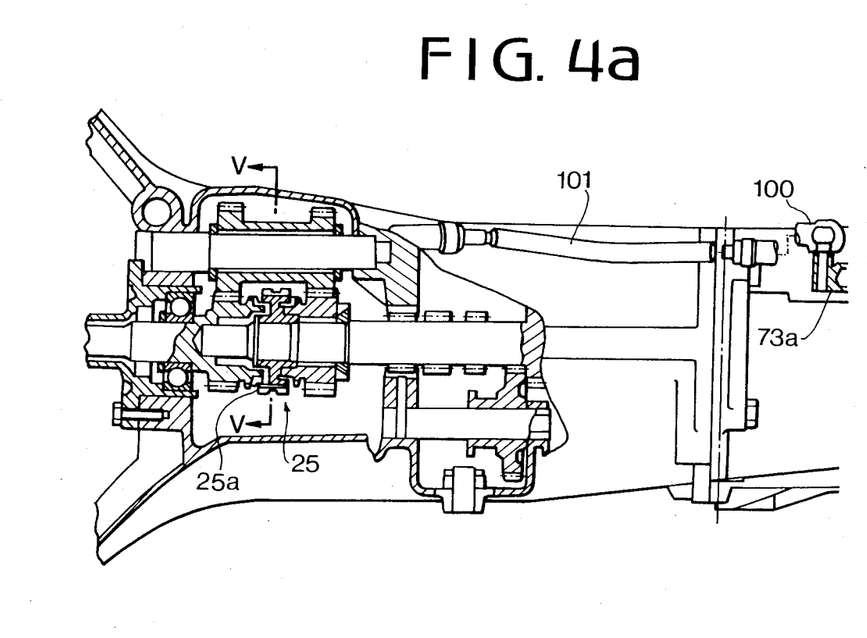
FIGS. 4a and 4b are plan views showing the same portion of FIGS. 3a, 3b partly in section.
Figure 4B:
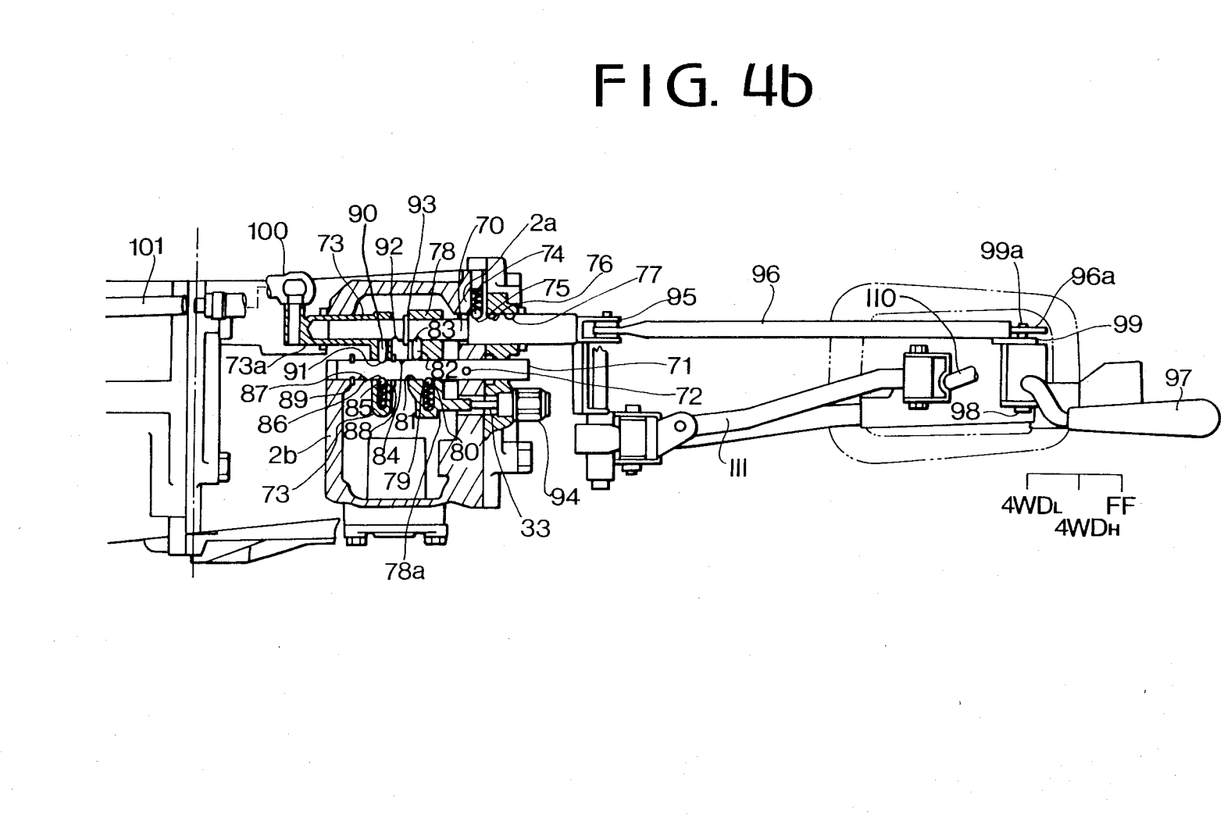
Figure 5:
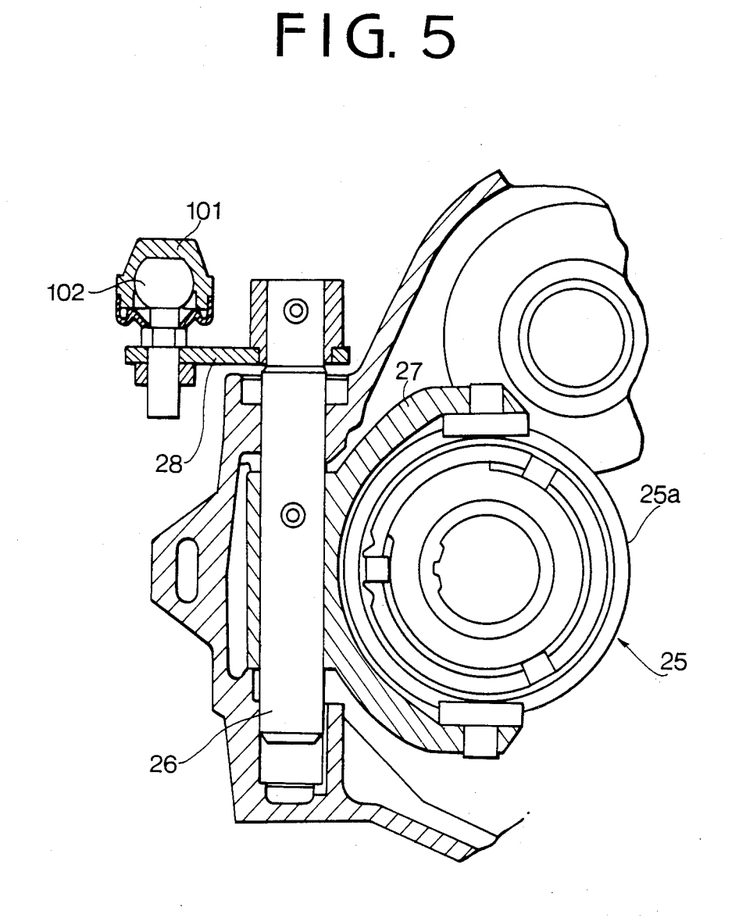

The rear end of the actuating rail 70 is coupled to a rod 96 through a joint 95. The rod 96 has an upward extension 96a, an upper end of which is pivotally connected to an arm 99 by a pin 99a. The arm 99 is secured to a select lever 97 which is rotatably supported on a shaft 98. As shown in FIG. 4b, the rail 70, rod 96, and extension 96a for connecting the rod 96 to the select lever 97 are arranged in alignment with each other. The lever 97 can be selectively moved to shift positions FF, 4WDH and 4WDL which are arranged on a single straight line. The front end of shaft 73a of arm 73 is coupled to a rod 101 through a ball joint 100. The rod 101 is connected through a ball joint 102 to a lever 28 of the shifting mechanism of the sub-transmission 20, as illustrated in FIG. 5. The lever 28 is secured to a vertical shaft 26, to which a shift fork 27 engaged with a sleeve 25a of synchronizer 25 is secured.

Figure 6A:
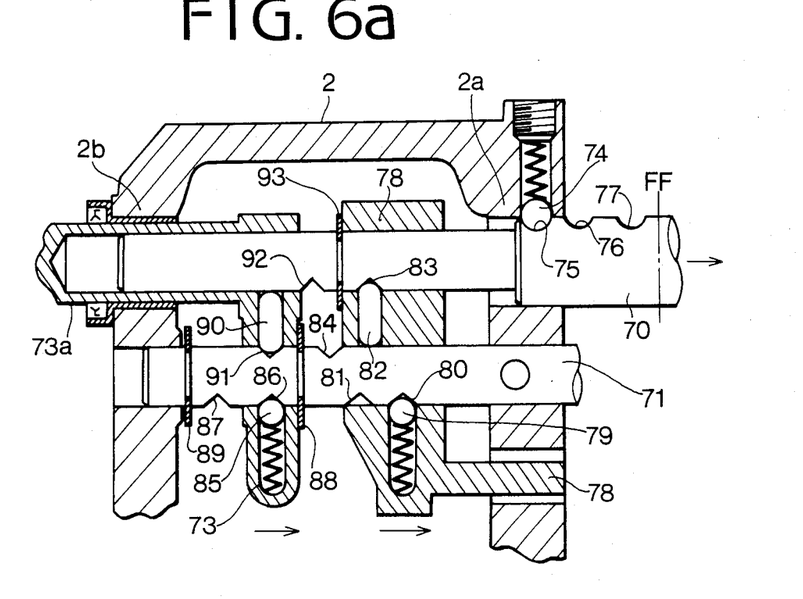
FIGS. 6a to 6c are broken sectional views, showing the operation of a selecting device of the present invention.

The operation of the apparatus will now be explained. When the select lever 97 is positioned at the front wheel driving position (FF) which is the rearmost position in the shift pattern (FIG. 3b), the rod 96 and the actuating rail 70 are located at the rearmost position as shown in FIG. 6a. At the position, the fork 78 is at right position in FIG. 6a, so that the transfer clutch 63 is disengaged. On the other hand, the fork 27 of the sub-transmission 20 is positioned to engage the sleeve 25a of the synchronizer 25 with the high speed gear 21. The fork 78 and arm 73 are held at their positions by the lock ball 79 and 85. Thus, the power of the engine is transmitted to the vehicle's front wheels through the high speed gear 21, transmission 40, and front differential 30, thereby to establish the two-wheel drive for the motor vehicle.

Figure 6B:
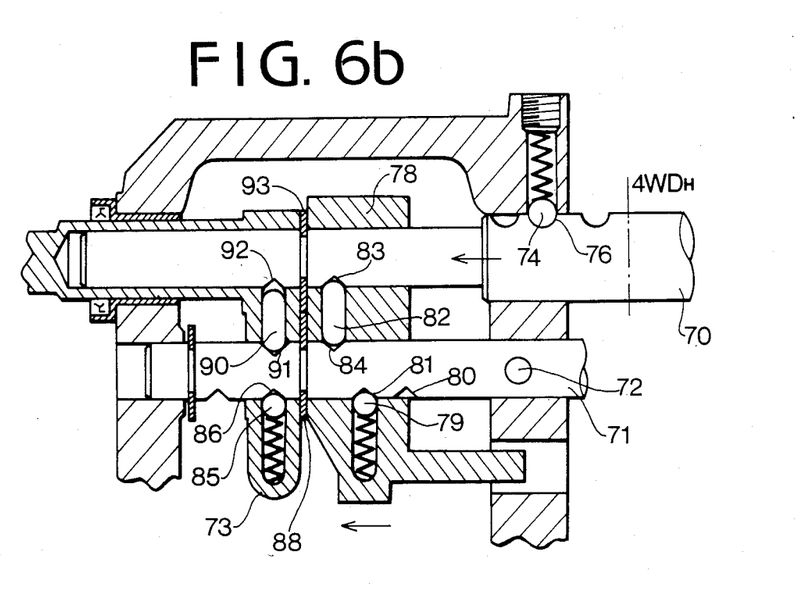
Figure 6C:
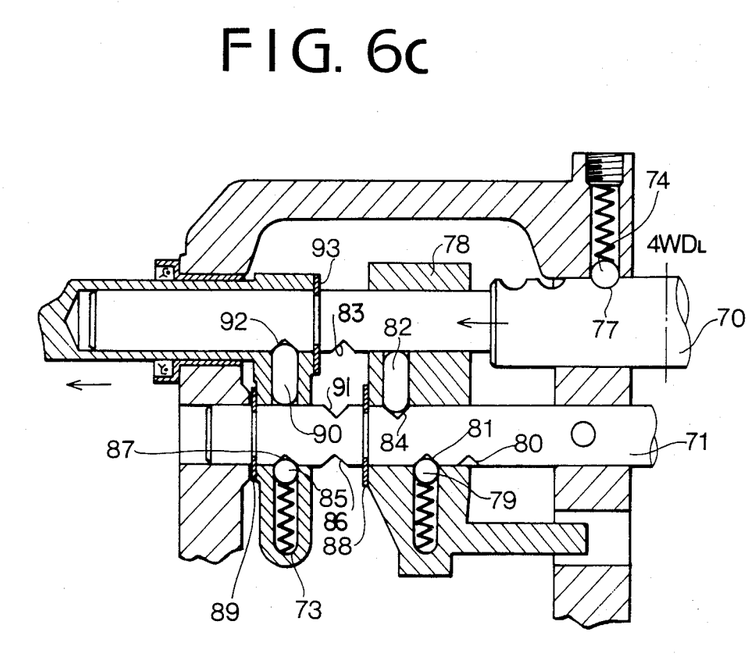

When the select lever 97 is forwardly shifted from the FF position to the high speed four-wheel driving position 4WDH, the actuating rail 70 is moved to the left as shown in FIG. 6b. Since the interlock pin 82 engages the notch 83 of the rail 70 in the state of FIG. 6a, the fork 78 is shifted to the left together with the rail 70, engaging the sleeve 63a of the clutch 63 with the gear 62. The fork 78 is held in the position by the engagement of ball 79 with notch 81. During this movement, the rail 70 moves in the shaft 73a and the connection arm 73 is held in the same position as FIG. 6a by the engagement of the pin 90 with the notch 91. Thus, the power transmitted from the main transmission 40 is transmitted also to the rear vehicle wheel through the transfer device 60 and the rear drive shaft 12, so that the four-wheel drive in the higher speed range ( in the lower gear ratio range ) is established. When the select lever 97 is further moved to the low speed range four-wheel drive position 4WDL, the rail 70 is further moved to the left as shown in FIG. 6c and the arm 73 is moved by the snap ring 93. At that time, the slant of the notch 91 causes the pin 90 to move into the notch 92 to engage therewith. The pin 90 is also shifted together with the arm 73. Therefore, the fork 27 of the sub-transmission 20 is rotated rearwardly by the lever 28 to engage the sleeve 25a of the synchronizer 25 with the low speed gear 22, so that the four-wheel drive in the lower speed rang ( in the higher gear ratio range ) is established.

When the select lever 97 is shifted from the position 4WDL to the position 4WDH, the arm 73 is shifted from the position of FIG. 6c to the position of FIG. 6b by the engagement of the pin 90 with the notch 92, so that only the sub-transmission 20 is changed into the higher speed range. When the select lever 97 is shifted from the 4WDH position (FIG. 6b) to the FF position (FIG. 6a), the fork 78 is shifted by the snap ring 93.

From the forgoing description, it will be understood that, in accordance with the present invention, since the actuating rail 70 for operating the transfer device 60, the rod 96, and the connecting portion (extension) 96a of the rod 96 connecting the latter with the select lever 97 are arranged in alignment with each other, frictional resistances and torsional stresses resulting from staggered disposition in rails and rods can be eliminated and hence the select lever can be easily and smoothly operated. Further the selecting device of the present invention is simple in construction and small in size because of its two-rail structure.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In an apparatus for selecting a power transmission system for a four-wheel drive motor vehicle having a main transmission and a sub-transmission operatively connected to an input shaft of the main transmission, the latter transmitting its ouput to main drive wheels of the vehicle, the sub-transmission including reduction gear trains and a manual clutch means manually operable to select transmitting speeds for transmitting output of an engine to the input shaft, a transfer device for further transmitting the output of the transmission to auxiliary drive wheels of the vehicle, the transfer device comprising a manual transfer clutch, the improvement comprising:

shaft means for shifting the clutch means in the sub-transmission;
a case;
an actuating rail disposed in co-axial relation to the shaft means and axially slidably engaged with the shaft means and slidably supported in the case;
a rod operatively connected to said actuating rail;
a fixed rail secured to the case and disposed in parallel with the actuating rail;
a shift fork slidably mounted on the actuating rail and the fixed rail, the shift fork being operatively connected to the manual transfer clutch;
an arm slidably engaged with the actuating rail and the fixed rail and integral with the shaft means;
a manually operable select lever operatively connected the actuating rail through said rod for moving the actuating rail in first and second moving ranges respectively;
the actuating rail and the rod being substantially in alignment with each other;
first interlock means provided between the actuating rail and the shift fork and the fixed rail for causing the actuating rail and the shift fork to come into fixed engagement relation to each other within said first moving range of the actuating rail, therby withing the first moving range of the actuating rail to shift the shift fork by manipulating the select lever, and for causing said shift fork and said fixed rail to engage with each other within said second moving range ofthe actuating rail;
second interlock means provided between the actuating rail and the arm and the fixed rail for causing the actuating rail and the arm to come into fixed engagement relation to each other within the second moving range of the actuating rail, thereby within the second moving range of the actuating rail to shift the shaft means by manipulating the select lever, and for causing the arm and the fixed rail to engage with each other within the first moving range of the actuating rail; and
means disposed on the actuating rail between the shift fork and the arm for moving the shift fork and the arm respectively.

2. The apparatus in accordance with claim 1, wherein each of the first and second interlock means comprises,
a pin slidable transversely to said rails, and notches formed in said rails, said pin removably engaging in said notches, each of said notches having slants for retracting the pin by axial movement of the actuating rail.

3. The apparatus in accordance with claim 1 further comprising
ball lock means for operatively locking the actuating rail at end positions of the actuating rail moving ranges.

4. The apparatus in accordance with claim 3, wherein the ball lock means are provided between the actuating rail and a supporting portion of the case.

5. The apparatus in accordance with claim 1, wherein said shaft means is a hollow cylinder in which said actuating rail is disposed.

6. The apparatus in accordance with claim 1, wherein said rod has a connecting portion operatively connecting the rod with the select lever,
said actuating rail, said rod and said connecting portion of the rod are substantially in alignment with each other.

* * * * *